US012643219B2

(12) United States Patent
Stulc

(10) Patent No.: US 12,643,219 B2
(45) Date of Patent: Jun. 2, 2026

(54) DEVICE FOR MOUNTING TOOLBOXES ONTO A RACK

(71) Applicant: Terry Stulc, Missoula, MT (US)

(72) Inventor: Terry Stulc, Missoula, MT (US)

( * ) Notice: Subject to any disclaimer, the term of this patent is extended or adjusted under 35 U.S.C. 154(b) by 0 days.

(21) Appl. No.: 18/958,455

(22) Filed: Nov. 25, 2024

(65) Prior Publication Data

US 2025/0332707 A1 Oct. 30, 2025

Related U.S. Application Data

(60) Provisional application No. 63/638,721, filed on Apr. 25, 2024.

(51) Int. Cl.
*B25H 3/04* (2006.01)
*B25H 3/02* (2006.01)

(52) U.S. Cl.
CPC ................. *B25H 3/04* (2013.01); *B25H 3/02* (2013.01)

(58) Field of Classification Search
CPC .................................... B25H 3/04; B25H 3/02
See application file for complete search history.

(56) References Cited

U.S. PATENT DOCUMENTS 3,025,122 A * 3/1962 Millman .............. A47B 96/061 248/225.11

* cited by examiner

*Primary Examiner* — Nirvana Deonauth
(74) *Attorney, Agent, or Firm* — Patent 360; Barry Choobin

(57) ABSTRACT

A device for mounting a toolbox to a rack system for organizing the toolboxes allowing quick removal and mounting of the toolboxes. The device has a body, a fastener tab extends downward from a proximal end of the body, a screw is configured into the fastener tab to secure the device to the slot in the rack. A handle support tab extends outwards from the middle of the body, wherein the handle support tab is configured to snugly receive a handle of the toolbox. A clip at the proximal end can be engaged to the slot.

3 Claims, 9 Drawing Sheets

DEVICE FOR MOUNTING TOOLBOXES ONTO A RACK

CROSS-REFERENCE TO RELATED APPLICATIONS

This application claims priority from a U.S. Provisional Patent Appl. No. 63/638,721, filed on Apr. 25, 2024, which is incorporated herein by reference in its entirety.

FIELD OF INVENTION

The present invention relates to a device for mounting a toolbox onto a rack, and more particularly, the present invention relates to a device for organizing the toolboxes by mounting them on racks.

BACKGROUND

The availability of the right tools at the right time is essential in workshops and construction sites. Depending upon the type of job, different varieties of tools may be required, and the number of tools required may vary. Keeping the different types of tools organized is essential for the efficiency of the job. Moreover, the required tool should be readily accessible to the user. It is undesired that the user keeps looking for a tool here and there. This may lead to the wastage of the time of the user and may also affect the job. Although organizing the tools is desired, spending too much time keeping the tools organized is also not desired.

Tools are generally organized in racks and toolboxes. Bigger workshops require the tools organized in toolboxes and the toolboxes organized in the racks. However, finding a good way to organize the toolboxes onto racks can be a headache.

SUMMARY OF THE INVENTION

The following presents a simplified summary of one or more embodiments of the present invention to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments in a simplified form as a prelude to the more detailed description that is presented later.

The principal object of the present invention is therefore directed to a device for mounting a toolbox to a rack rail.

Another object of the present invention is that the toolbox can be readily accessible.

Still, another object of the present invention is that the device is versatile, making the mounting of toolboxes easier and quicker.

In one aspect, disclosed is a device for mounting a toolbox to a rack rail, the rack rail comprising spaced apart slots. The device comprises a body of an elongated profile having a proximal end and a distal end; a clip at the proximal end, wherein the clip has an indent configured to engage with an edge of a slot in the rack rail; and a handle support tab extends outwards and sidewards from a middle portion of the body, wherein the handle support tab is configured to snugly receive a handle of the toolbox. The device further comprises a fastener tab that extends downwards from the proximal end of the body, the fastener tab having a threaded hole, wherein the threaded hole is positioned such that when the clip is engaged to the edge of the slot, the threaded hole of the fastener tab aligns with a threaded hole in the rack rail below the slot. The device comprises a fastener that has threads that correspond to threads of the threaded hole in the rack rail and the fastener tab.

In one aspect, disclosed is a method for mounting a toolbox to a rack rail. The method comprises providing a first device comprising a body of an elongated profile having a proximal end and a distal end, a clip at the proximal end, wherein the clip has an indent configured to engage with an edge of a slot in the rack rail, and a handle support tab extends outwards and sidewards from a middle portion of the body, wherein the handle support tab is configured to snugly receive a handle of the toolbox. The method further comprises inserting the clip of the first device into a first slot in the rack rail such that the indent of the first device engages with an edge of the first slot; securing the first device to the first slot; securing a second device to a second slot in the rack rail, wherein the second device is similar to the first device, wherein the second slot is adjacent to the first slot; positioning the toolbox between the first device and the second device; and securing a first handle of the toolbox to the first device and a second handle of the toolbox to the second device.

BRIEF DESCRIPTION OF DRAWINGS

The accompanying figures, which are incorporated herein, form part of the specification and illustrate embodiments of the present invention. Together with the description, the figures further explain the principles of the present invention and enable a person skilled in the relevant arts to make and use the invention.

DETAILED DESCRIPTION

Figure 1:
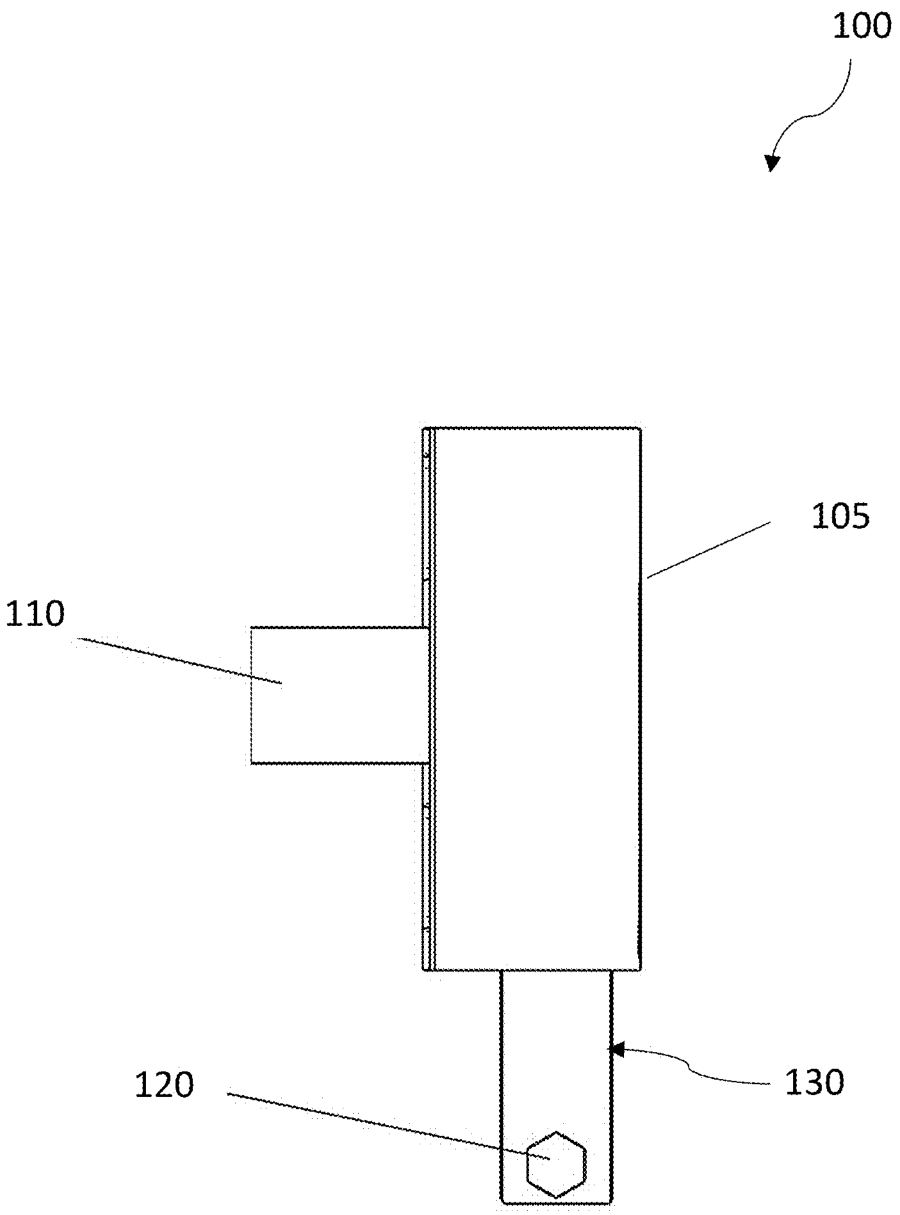
FIG. 1 is a front view of the device, according to an exemplary embodiment of the present invention.
Figure 2:
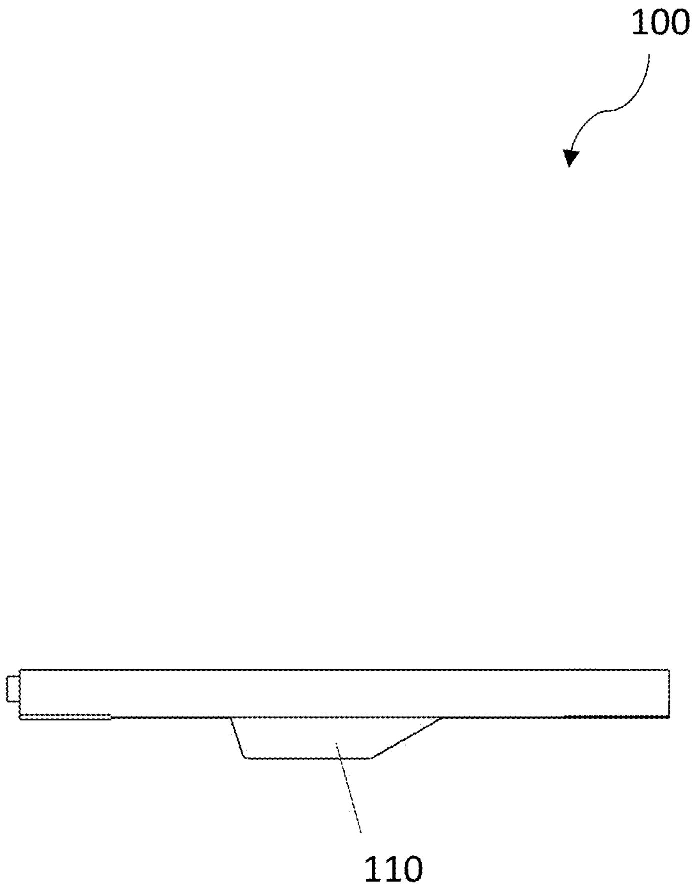
FIG. 2 is a side view of the device, according to an exemplary embodiment of the present invention.
Figure 3:
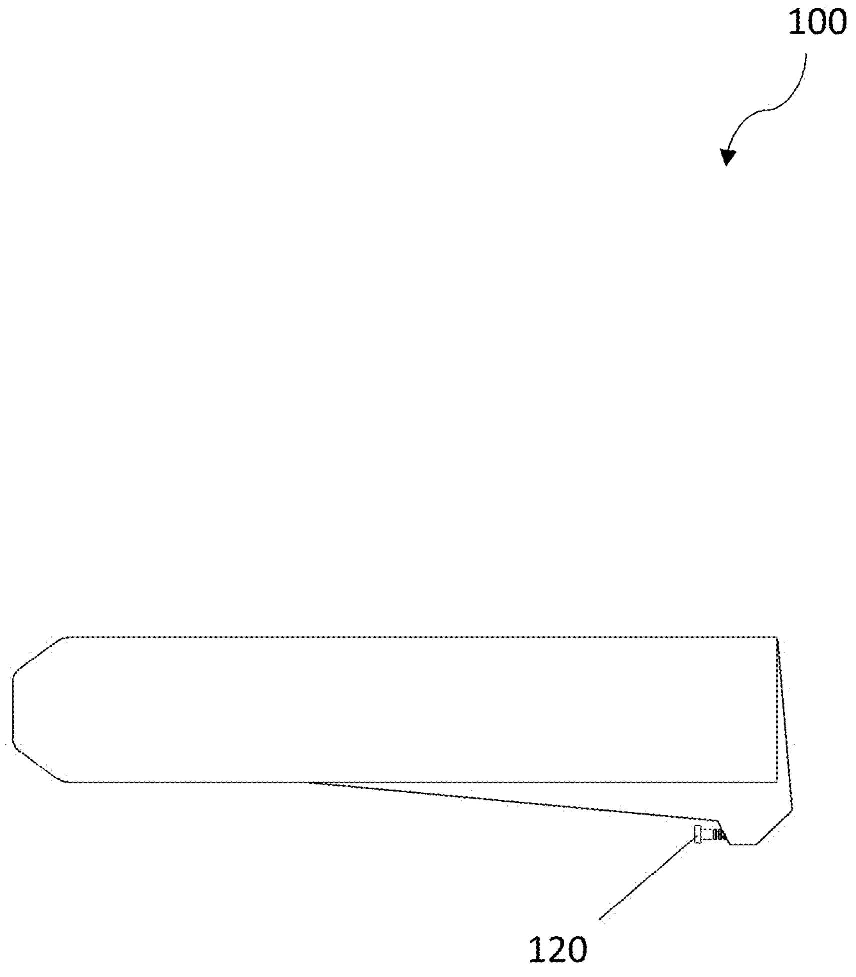
FIG. 3 is another side view of the device, according to an exemplary embodiment of the present invention.

Subject matter will now be described more fully hereinafter with reference to the accompanying drawings, which form a part hereof, and which show, by way of illustration, specific exemplary embodiments. Subject matter may, however, be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, the subject matter may be embodied as methods, devices, components, or systems. The following detailed description is, therefore, not intended to be taken in a limiting sense.

The word “exemplary” is used herein to mean “serving as an example, instance, or illustration.” Any embodiment described herein as “exemplary” is not necessarily to be construed as preferred or advantageous over other embodiments. Likewise, the term “embodiments of the present invention” does not require that all embodiments of the invention include the discussed feature, advantage or mode of operation.

The terminology used herein is for the purpose of describing particular embodiments only and is not intended to be limiting of embodiments of the invention. As used herein, the singular forms “a”, “an” and “the” are intended to include the plural forms as well, unless the context clearly indicates otherwise. It will be further understood that the terms “comprises”, “comprising,”, “includes” and/or “including”, when used herein, specify the presence of stated features, integers, steps, operations, elements, and/or components, but do not preclude the presence or addition of one or more other features, integers, steps, operations, elements, components, and/or groups thereof.

The following detailed description includes the best currently contemplated mode or modes of carrying out exemplary embodiments of the invention. The description is not to be taken in a limiting sense but is made merely to illustrate the general principles of the invention since the scope of the invention will be best defined by the allowed claims of any resulting patent.

Disclosed is a device for mounting a toolbox to a rack. Referring to FIGS. 1-6 which show different views of the disclosed device 100. The device 100 includes a body 105 that can slide fit into a handle cavity of a toolbox. A handle support tab 110 may extend outwards and sidewards from a middle portion of the body 105. The handle support tab 110 can secure the handle of the toolbox. The shape and size of the handle support tab 110 may correspond to a slot in the handle of the toolbox. This may allow the handle to fit over the handle support tab 110. The body 105 may be of an elongated profile which allows the toolbox to slide within a predetermined distance on device 100. As shown in the drawings, the body 105 is of elongated rectangular profile having a proximal end and a distal end. The proximal end may be engaged to a slot in the rack rail. The proximal end of the body may have a hook that may engage with an edge of the rail. The hook may pop in and out of the proximal end of the body 105. The hook may also be referred to herein as a clip, which allows for attaching the device to e-slot or t-slot channels in the rack.

Figure 4:
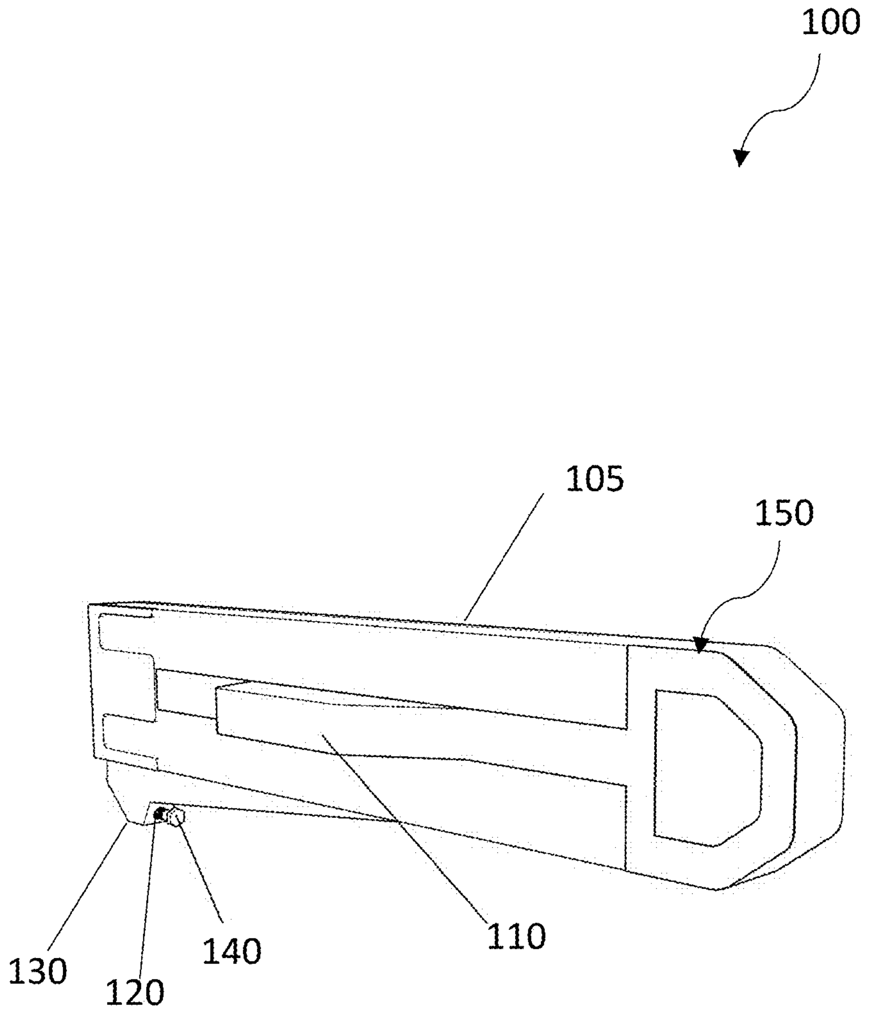
FIG. 4 is a perspective view of the device, according to an exemplary embodiment of the present invention.
Figure 5:
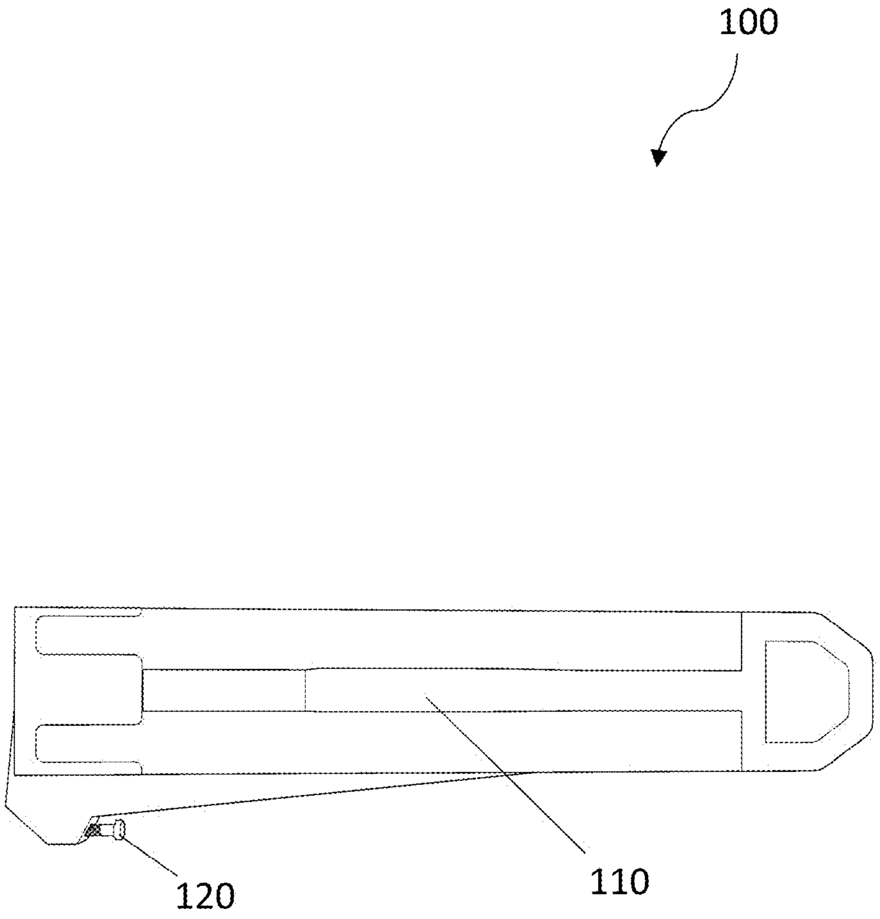
FIG. 5 is another side view of the device, according to an exemplary embodiment of the present invention.
Figure 6:
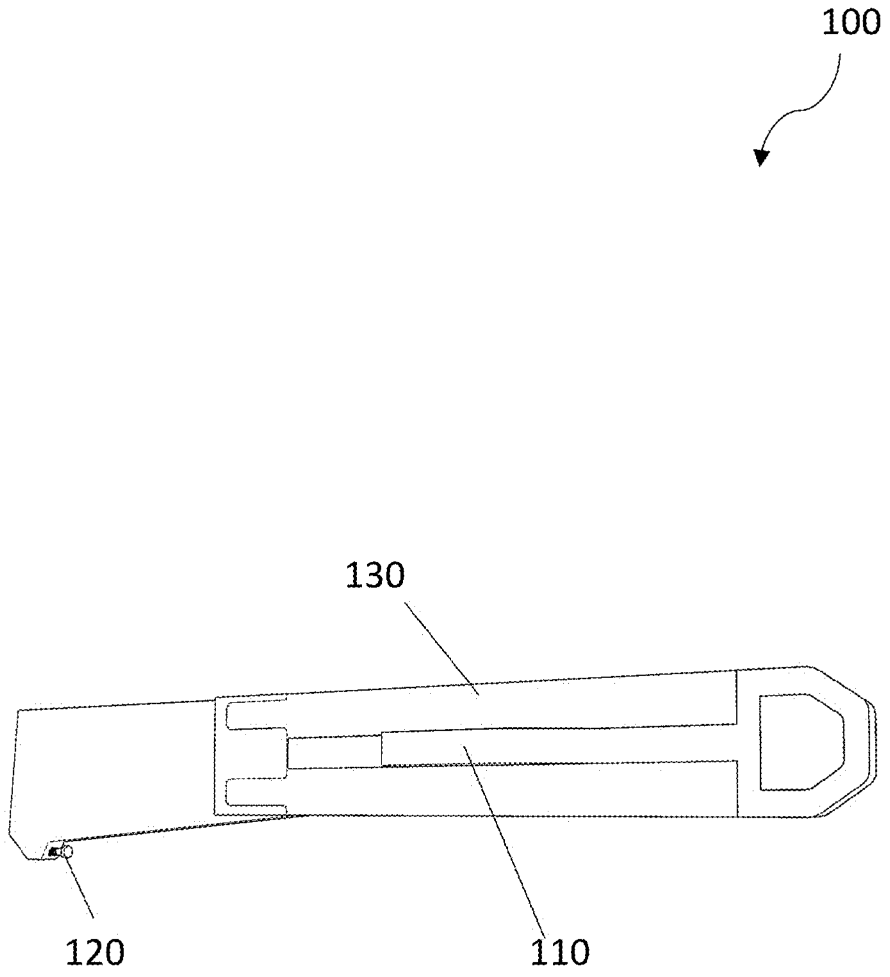
FIG. 6 shows another implementation of the device, according to an exemplary embodiment of the present invention.
Figure 7:
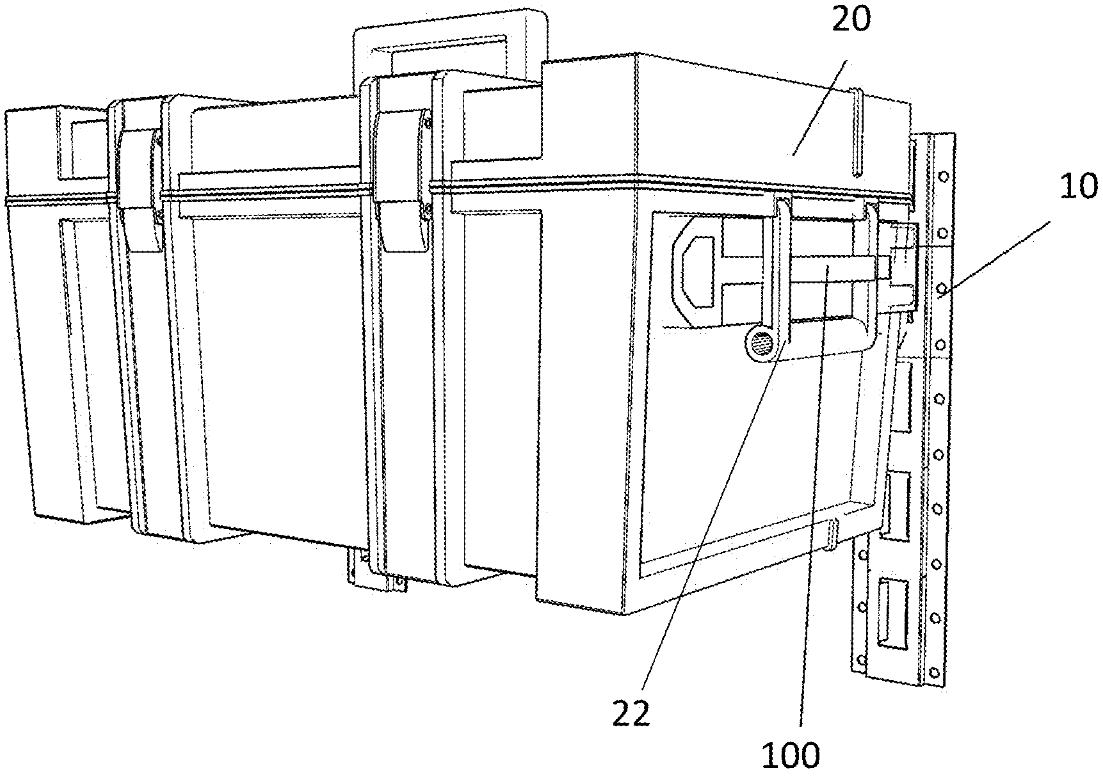
FIG. 7 shows a toolbox mounted to a rack using the device, according to an exemplary embodiment of the present invention.

A tab 130 extends downwards from the proximal end of the body 105. The fastener tab 130 may include a screw hole 120 that may correspond to a screw hole in the rail. When the clip of the device is engaged to the rail, the screw hole 120 in the fastener tab 130 may align with a screw hole in the rail. The screw holes may be threaded which allows a fastener 140 to be fastened. Thus, a fastener, such as a hex nut, may be used to secure the device 100 to a rail. FIG. 7 shows the device 100 mounted to the rack rail 10. FIG. 4 shows a hex screw 140 shown inserted into the screw hole 120.

The hook or clip may be made from metal, such as stainless steel, iron, and the like. The clip may engage with the rack rail which may also be made from metal. The metal offers durability to the device and allows the device to hook to the rail. The body of the device may be made from any suitable material, such as plastic, metal, and the like. The tab may also be made from any suitable material, such as plastic and metal. The handle support tab may also be made from suitable materials, such as plastic and metal. In certain implementations, the handle support tab and the body may be integrally manufactured. In certain implementations, the tab and the body may be integrally manufactured. In certain implementations, the tab, the handle support tab, and the body may be integrally manufactured. Certain metals, such as aluminum, steel, and the like can be used to make parts of the disclosed device. Parts of the disclosed device may be made using suitable molding or extrusion process.

As shown in FIG. 7, the handles 22 of the toolbox 20 may be lifted, and the toolbox is positioned between two adjacent devices. The toolbox may slid over the two devices, wherein the two devices may fit into the two handle cavities of the toolbox. The handle cavities are below the handles. When the handles are positioned over the handle support tabs, the handles can be pushed down to fit over the handle support tabs of the two devices. The rail may be of an elongated profile with multiple spaced slots throughout the length of the rail. This may allow multiple toolboxes to be mounted to a single rail. Also, spaces between adjacent toolboxes mounted to the rail may be easily adjusted.

The device serves as an easy-to-use solution for securely attaching the toolboxes to rack systems. With a clip-in design, it effortlessly connects to standard e-slot channels. It also offers versatile mounting options. The disclosed device can be adapted for different toolbox designs including different sizes of the same toolbox. For example, FIG. 7 shows a DEWALT® Tough System 2.0 toolbox.

The plastic body of the device may be custom-made to snugly fit the toolbox handles and incorporate a metal “drawer slide” for smooth maneuverability. Designed for swift attachment and detachment, this device streamlines tool organization and accessibility in various work environments.

Unlike existing rack mount systems that require disassembly for adjustment, the Rack Mounting device according to the present invention offers a quick-release, fully adjustable design. This flexibility allows users to customize the bracket to fit different-sized toolboxes without the need for complex adjustments or dismantling.

Again, referring to FIG. 4, the distal end of the device may include a handle 150. The handle may be built into the body 105.

Figure 8:
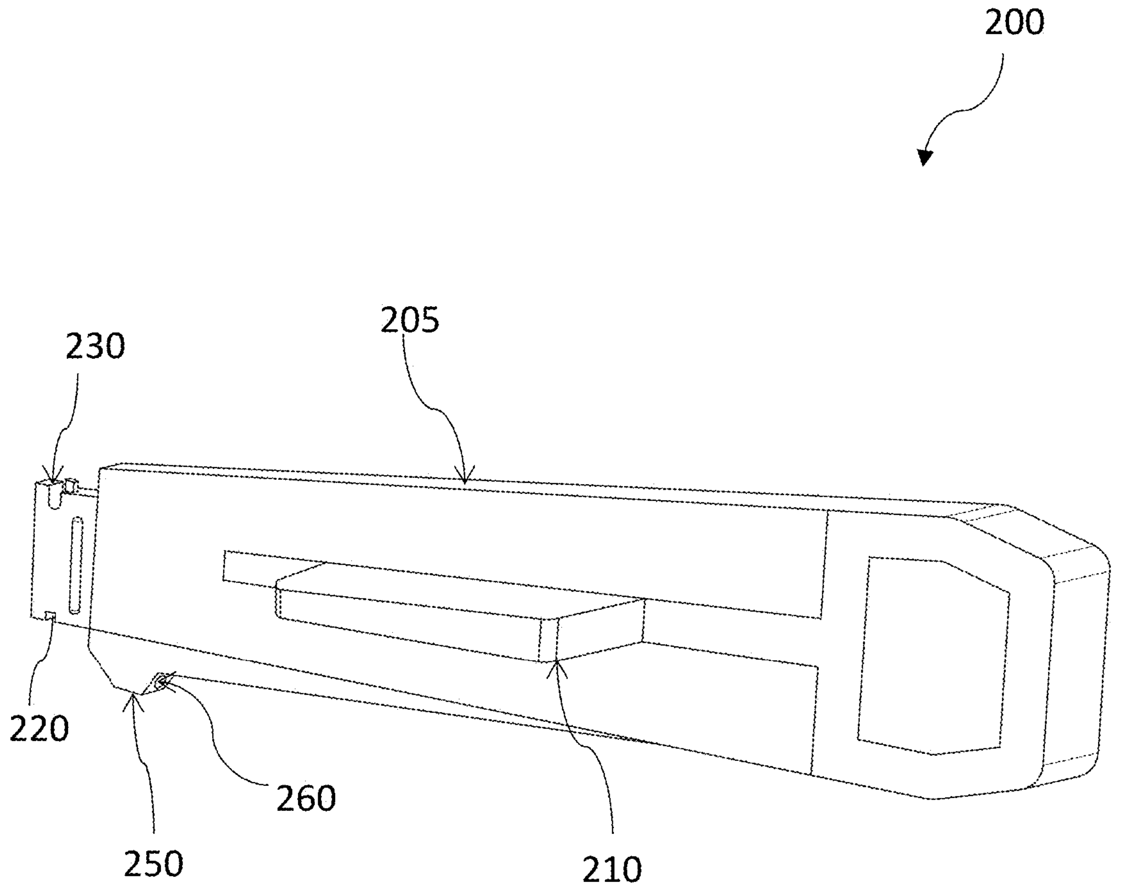
FIG. 8 shows another implementation of the device, according to an exemplary embodiment of the present invention.

Now referring to FIG. 8 which shows the clip of the device. The device 200 includes a body 205 that can slide fit into a handle cavity of a toolbox. The device includes a handle support tab 210 that may extend from the middle portion of the body. The handle support tab 210 can receive the handle of the toolbox. The shape and size of the handle support tab 210 may correspond to a slot in the handle of a toolbox. This may allow the handle to fit over the handle support tab 210. The body 205 may be of an elongated profile which allows the toolbox to slide within a predetermined distance on device 200.

Figure 9:
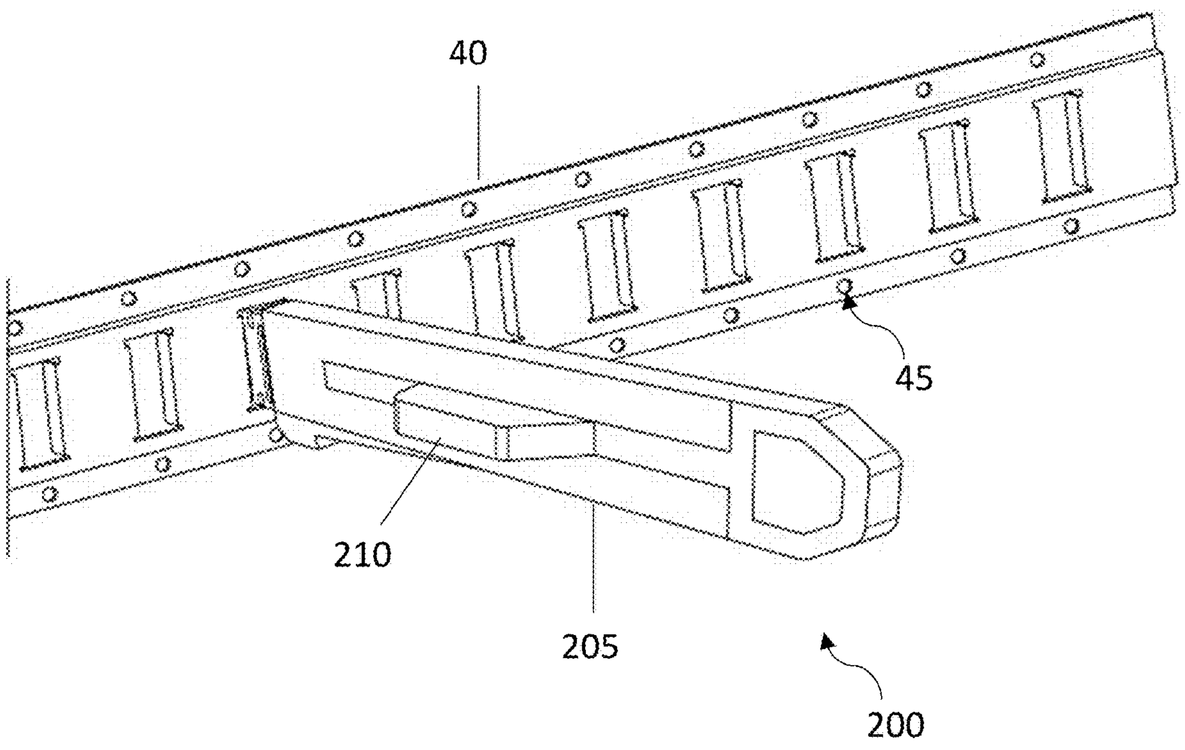
FIG. 9 shows the attachment of the device to a rack rail, according to an exemplary embodiment of the present invention.

As shown in FIG. 8, the body 205 is of elongated rectangular profile having a proximal end and a distal end. The proximal end may engage to the rack rail. FIG. 9 shows the mounting of the device 200 to the rack rail 40. The proximal end of the body 205 may have a clip 220 that may engage with an edge of a slot in the rail. The rail may include e-slots, t-slots, or like slots to which a clip may be engaged. The clip 220 may include an indent 230 on its top side, the indent 230 may hook to an edge of the slot.

A tab 250 extends downwards from the proximal end of the body 205. The tab 250 may include a screw hole 260 that may correspond to a screw hole 45 in the rail 40. The device may be inclined slightly, and then inserted into one of the slots in the rail. The indent can be engaged with the upper edge of the slot, and then the device can be straightened. When the clip of the device is engaged to the upper edge of the slot in the rail, the fastener tab may be pressed on to the rail and the screw hole 260 in the fastener tab 250 may be aligned with the screw hole 45 in the rail 40. The screw holes may be threaded that allows a fastener to be fastened. Thus, a fastener, such as a Hex nut, may be used to secure the device 200 to a rail.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above-described embodiment, method, and examples, but by all embodiments and methods within the scope and spirit of the invention as claimed.

What is claimed is:

1. A method for mounting a toolbox to a rack rail, the method comprising:

providing a first device comprising:

a body having an elongated profile with a proximal end and a distal end, a clip at the proximal end, the clip having an indent configured to engage with an edge of a slot in the rack rail, and a handle support tab extending outwardly and sideways from a middle portion of the body, the handle support tab being configured to receive a handle of the toolbox;

inserting the clip of the first device into a first slot in the rack rail such that the indent of the first device engages with an edge of the first slot;

securing the first device to the first slot;

securing a second device to a second slot in the rack rail, wherein the second device being identical to the first device, wherein the second slot and the first slot are spaced apart;

positioning the toolbox between the first device and the second device; and securing a first handle of the toolbox to the first device and a second handle of the toolbox to the second device.

2. The method of claim 1, wherein the first device further comprises:

a fastener tab that extends downwards from the proximal end of the body, the fastener tab having a threaded hole, wherein the threaded hole is positioned such that when the clip is engaged to the edge of the first slot, the threaded hole of the fastener tab aligns with a threaded hole in the rack rail below the first slot.

3. The method of claim 2, wherein the first device further comprises:

a fastener having threads that correspond to threads of the threaded hole in the rack rail and the fastener tab.

* * * * *